2,793,221
OZONOLYSIS OF PRIMARY AMINES

Frank P. Florentine, Jr., Stockbridge, Mass., assignor to General Electric Company, a corporation of New York No Drawing. Application July 29, 1954,
Serial No. 446,643

5 Claims. (Cl. 260—413)

This invention relates to a new and novel method of producing carboxylic acids and more particularly to the preparation of aliphatic carboxylic acids by the reaction of primary amines with an ozone-containing gas.

Strecker and Thienemann, Ber., 53, 2096 (1920), have reported the reaction of methyl amine with ozone to produce formaldehyde. However, there is no known method for the ozonization of primary amines to acids.

For the first time, the present invention makes available a new and novel ozonization method of producing aliphatic carboxylic acids directly from primary amines by the reaction of an ozone-containing gas on primary amines.

The present invention is based upon the discovery that aliphatic carboxylic acids can be produced simply and economically by controlled reaction of an ozone-containing gas on primary amines represented by the general formula R—$CH_2NH_2$, R being a hydrocarbon radical, for example, straight chain or branched chain aliphatic hydrocarbon radical having from 1 to 20 carbon atoms or an aromatic hydrocarbon radical, for instance, phenyl, naphthyl, etc., which may be substituted with various inert groups, for example, groups which do not partake of the principal reaction such as nitro, halogen, carboxyl, acyloxy, hydroxyl, etc.

The carboxylic acids of the invention are produced, it is believed, by virtue of attack through oxidation at the carbon atom adjacent to the amino group and oxidation of the amino nitrogen followed by cleavage of the C—N bond. No products have been isolated from this reaction which might have resulted from the normally to be expected addition of oxygen to the nitrogen atom. The probable course of the reaction is as follows:

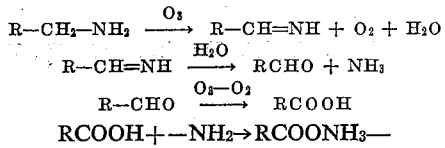

RCOOH+—$NH_2$→RCOON$H_3$—

The reaction of the present invention may be conducted under a wide range of operating conditions. With respect to temperatures, suitable temperatures may range from as low as the melting point of the amine up to 50° C. Generally, low temperatures within this range are preferred so as to obtain a minimum of undesirable side products. The upper temperature limit of 50° C. is below the ozone decomposition temperature. In operation, the reaction temperature can be controlled by regulating the temperature of either the primary amine or the reaction gas prior to reaction. Operating pressures which may be employed include reduced, atmospheric or superatmospheric pressures.

Several methods may be employed in effecting the present reaction. For example, reaction can be initiated by means of concurrent flow of the reactants or by concomitant mixing of the reactants. Another suitable technique may be by bubbling the ozone-containing reaction gas through the primary amine either in the presence or absence of a solvent for the reaction.

When the reaction of the present invention is conducted in the presence of a solvent as the reaction medium, better results are thereby obtained, as illustrated in the examples. As illustrated in the foregoing equations, there must be sufficient water present during the reaction to insure hydrolysis. Accordingly, the solvent employed must be water-miscible and must be used as an aqueous solution containing sufficient water for the hydrolysis step. Representative solvents for the purpose include aliphatic alcohols such as methanol, propanol, butanol, etc., aliphatic fatty acids such as acetic, propionic, butyric, etc., esters of the aforementioned acids, ketones such as acetone, methyl ethyl ketone, methyl propyl ketone, etc., and halogenated hydrocarbons such as carbon tetrachloride, chloroform, etc. The proportion of solvent employed must be sufficient to keep both the amine and the water in solution.

The ozone-containing gas employed in the present reaction may consist of a mixture of ozone in oxygen or a mixture of ozone in air. The concentration of ozone may be varied within certain limits, for example, from about 1 to about 10 percent, by weight of the mixture. Usually, the concentration is determined by reacting a measured volume of the gas with neutral aqueous potassium iodide, acidulation and titration with a standard thiosulfate solution.

The primary amines found eminently suitable for reaction in accordance with the present invention as mentioned previously may be either aliphatic or aromatic in nature and may be substituted with various inert radicals. The important considerations in selecting an amine for the reaction are (1) that it be primary in nature, that is, have two hydrogens on the nitrogen atom, (2) that the alpha carbon have two hydrogen atoms, and (3) that it be liquid or be dissolved under the conditions of reaction.

In order that those skilled in the art may better understand how this invention may be carried into effect, the following examples are given by way of illustration and not by way of limitation. All parts and percentages are by weight.

Example 1

A reaction gas consisting of 1.5 mol percent of ozone in oxygen was passed through 37.7 parts of n-decylamine until the off-gas gave a strong positive ozone test. This was determined by holding a strip of KI-starch test paper in the exit gas stream and observing the coloring of the strip from which it could be told that ozone absorption gradually grew less. After approximately 0.17 mol of ozone had been absorbed, 40.1 parts of a semi-solid yellow mush product was obtained. 26.5 parts of this product were refluxed with 100 parts of 10 percent aqueous sodium hydroxide for approximately 1.5 hours. Following ether extraction the aqueous alkaline layer was acidified with concentrated hydrochloric acid yielding approximately 5.3 parts of a pale yellow oil which analyzed capric acid of approximately 80 to 90 percent purity. Calculated for the following reactions

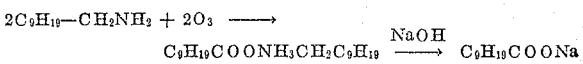

this corresponds to 27 percent of the theoretical yield.

The alkali-insoluble, ether-soluble product was a waxy solid from which no single pure material could be distilled. It had a wide-boiling distillable fraction, specifically 120° C. at 30 mm. pressure to 200° C. at 1 mm. pressure and gave a positive aldehyde test. Analysis also revealed nitrogen to be present. It was presumed to be capric aldehyde which had been polymerized either with itself or with ammonia or n-decylamine, and that the alkali-insoluble material was a mixture of these monomers and polymers.

*Example 2*

This example illustrates the effect of employing a solvent for the reaction. In a manner similar to that described in each of the foregoing examples, a solution of 15.5 parts of n-decylamine in 200 parts of methanol was reacted with a gas stream containing approximately 1.5 mol percent of ozone in oxygen until approximately 0.18 mol of ozone had been absorbed. The product was refluxed for approximately 1.5 hours with 80 parts of 10 percent aqueous sodium hydroxide solution, the bulk of the methanol distilled off and the remaining product poured into water and ether extracted. The resulting aqueous caustic layer was acidified with 15 parts of concentrated sulfuric acid to yield approximately 4 parts of capric acid, corresponding to 52 percent of theory for the reaction

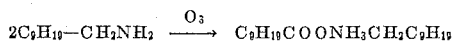

$$2C_9H_{19}-CH_2NH_2 \xrightarrow{O_3} C_9H_{19}COONH_3CH_2C_9H_{19}$$

The yield of acid obtained in Example 2 is substantially higher than obtained in Example 1 and it may be attributed to a reduction in the extent of polymerization at the aldehyde stage due to dilution with the methanol solvent.

While the invention has been illustrated more particularly wtih respect to the production of capric acid from n-decylamine, it readily will be appreciated that other aliphatic primary amines having shorter and longer chain lengths than n-decylamine, for example, n-propyl amine, n-butyl amine, n-amylamine, n-hexylamine, etc., n-undecylamine, n-dodecylamine, n-tridecylamine, etc, may be reacted in a similar manner to produce corresponding aliphatic carboxylic acids. Similarly, primary amines having an aromatic hydrocarbon radical in the molecule, such as benzyl amine, phenylethylamine, phenylpropylamine, etc., may be reacted to produce corresponding aromatic carboxylic acids.

What I claim as new and desire to secure by Letters Patent of the United States is:

1. The method of producing a carboxylic acid which comprises reacting a primary amine having two hydrogen atoms on the alpha carbon represented by the general formula R—CH₂—NH₂, wherein R is a saturated aliphatic hydrocarbon radical, with a gaseous mixture selected from the group consisting of ozone in air and ozone in oxygen until ozone absorption is substantially complete, the concentration of ozone in said other gas being from about 1 to about 10 percent, by weight of the mixture, refluxing the resulting ozonization product with an aqueous base, removing a resulting aqueous alkaline phase, and acidifying the alkaline phase thereby to obtain a carboxylic acid.

2. The method of producing a carboxylic acid which comprises reacting a primary amine having two hydrogen atoms on the alpha carbon represented by the general formula R—CH₂—NH₂, where R is a saturated aliphatic hydrocarbon radical with a gaseous mixture of ozone and oxygen comprising from about 1 to about 10 percent, by weight of the mixture, of ozone in oxygen, until ozone absorption is substantially complete refluxing the resulting ozonization product with an aqueous base, removing a resulting aqueous alkaline phase, and acidifying the alkaline phase thereby to obtain a carboxylic acid.

3. The method of producing a carboxylic acid which comprises reacting a primary amine having two hydrogen atoms on the alpha carbon represented by the general formula R—CH₂—NH₂, wherein R is a saturated aliphatic hydrocarbon radical in an organic solvent with a gaseous mixture of ozone in air until ozone absorption is substantially complete, the concentration of ozone being from about 1 to about 10 percent, by weight of the mixture, refluxing the resulting ozonization product with an aqueous base, removing a resulting aqueous alkaline phase, and acidifying the alkaline phase thereby to obtain a carboxylic acid.

4. The method of producing capric acid which comprises reacting n-decylamine with a gaseous mixture comprising ozone in oxygen until ozone absorption is substantially complete, the concentration of ozone being from about 1 to about 10 percent, by weight of the mixture, refluxing the resulting ozonization product with an aqueous base, removing a resulting aqueous alkaline phase, and acidifying the alkaline phase thereby to obtain capric acid.

5. The method of producing capric acid which comprises reacting n-decylamine in an organic solvent with a gaseous mixture comprising ozone in oxygen until ozone absorption is substantially complete, the concentration of ozone being from about 1 to about 10 percent, by weight of the mixture, refluxing the resulting ozonization product with an aqueous base, removing a resulting aqueous akaline phase, and acidifying the alkaline phase thereby to obtain capric acid.

References Cited in the file of this patent

UNITED STATES PATENTS 2,001,171    Weibezahn et al. _____ May 14, 1935

OTHER REFERENCES

Strecker and Thienemann: Berichte, 53 (1920), pages 2096–2113.

Long: Chemical Reviews, 27 (1940), 437–493 (specifically page 459).

Harris et al.: Z. Physiol. Chemie, 51 (1907), 373–383.